United States Patent Office 2,779,809
Patented Jan. 29, 1957

2,779,809
ACCELERATION OF VULCANIZATION BY MEANS OF N-MONO-TERTIARY-ALKYL-THIAZOLINE-2-SULFENAMIDES

Edward L. Carr, Akron, Ohio, assignor to The Firestone Tire & Rubber Company, Akron, Ohio, a corporation of Ohio No Drawing. Application December 7, 1953, Serial No. 396,761

6 Claims. (Cl. 260—788)

This invention relates to the vulcanization of rubber or the like by the use of a new class of accelerators.

This application is a continuation-in-part of my co-pending application Serial No. 90,772, filed April 30, 1949, now abandoned, which was a continuation-in-part of my application Serial No. 586,039, filed March 31, 1945, now abandoned.

An object of the invention is to provide an improved process of vulcanizing a rubber or synthetic rubber. Another object is to provide a vulcanizable rubber composition capable of rapid vulcanization at customary rubber curing temperatures, but free from the danger of setting-up during factory processing operations. The above and further objects will be manifest in the description of the invention which follows.

The new class of accelerators of this invention possesses the following formula:

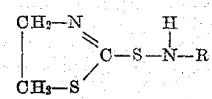

wherein R is a tertiary alkyl radical containing from 4 to 12 carbon atoms. The invention includes thiazoline-2-sulfenamides of the above structure in which R is tert-butyl, tert-amyl, tert-hexyl, tert-heptyl, tert-octyl, tert-nonyl, tert-decyl, tert-undecyl and tert-dodecyl. The tertiary-butyl, -octyl and -dodecyl radicals are preferred because of their ready availability.

The following examples are given to illustrate the new class of accelerators and methods by which they can be synthesized.

EXAMPLE 1

*Preparation of N-tert-butyl-thiazoline-2-sulfenamide*

A flask containing 45 grams of tert-butylamine was stirred and cooled to 0° C. During one hour there was added with stirring 335 ml. of 1.79 molar sodium hypochlorite solution, keeping the temperature of the mixture at 0° to 5° C. To the resulting mixture there was added over a 2 hour period 200 ml. of a 3 molar solution of the sodium salt of 2-mercaptothiazoline while the temperature was maintained at 0° to 5° C. The cooling bath was then removed, the mixture was stirred an additional 15 to 20 minutes and then poured over a liter of ice and water with stirring. After the ice had melted, the fine, white precipitate was filtered and washed on a Buchner funnel until the washings were neutral. The separated product was dissolved in a mixture of 150 ml. 95% ethyl alcohol and 100 ml. water at reflux temperature, and the solution was allowed to cool and crystallize. The separated, white crystalline product was dried over potassium hydroxide in a vacuum desiccator. Melting point 101–103° C. Analysis:

|  | Found | Calculated from formula |
|---|---|---|
| Percent Carbon | 44.3 | 44.2 |
| Percent Hydrogen | 7.3 | 7.4 |
| Percent Nitrogen | 13.7 | 14.7 |

EXAMPLE 2

*Preparation of N-tt-octyl-thiazoline-2-sulfenamide*

A 1-liter 3-necked flask was equipped with an agitator, thermometer and dropping funnel. A quantity (80 grams) of tt-octylamine was placed in the flask and cooled to 0° C. by means of a cooling bath. During 75 minutes there was added 335 ml. of a 1.79 molar solution of sodium hypochlorite, the reaction temperature being maintained at 0° to 5° C. The mixture appeared milky during addition of the hypochlorite. To the resulting mixture there was added over a period of 2 hours 200 ml. of a 3 molar solution of the sodium salt of 2-mercaptothiazoline while the contents of the flask were kept at 0° to 5° C. A soft, white solid separated and floated to the top of the reaction mixture. Thereafter the mixture was stirred an additional hour without the cooling bath, during which time the temperature of the mixture gradually rose to 20° C. The reaction mixture was then poured into a liter of ice and water, the ice was allowed to melt and the water was poured off of the precipitated solid product. The latter was washed several times by decantation with ice water, and then was recrystallized from a mixture of 200 ml. of 95% ethyl alcohol and 65 ml. of water. The white needles were dried over potassium hydroxide in a desiccator. Melting point 95–97° C. Analysis:

|  | Found | Calculated from formula |
|---|---|---|
| Percent Carbon | 53.8 | 53.6 |
| Percent Hydrogen | 9.0 | 9.0 |
| Percent Nitrogen | 11.1 | 11.4 |

The sulfenamides produced in accordance with Examples 1 and 2 were tested as rubber vulcanization accelerators in the following natural rubber tire tread formula, in which all parts are given by weight:

Formula I

| | |
|---|---|
| Rubber | 100 |
| HAF Carbon black | 50 |
| Zinc oxide | 3 |
| Softener | 3 |
| Stearic acid | 2.6 |
| Antioxidant | 1.8 |
| Sulfur | 2.6 |
| Accelerator | 0.5 |

Four rubber compositions were mixed in a conventional manner, in accordance with Formula I, to provide vulcanizable compositions differing only in the accelerator employed. Two test accelerators were those produced according to Example 1 and 2, another was the commercial accelerator 2-mercaptothiazoline; and the fourth composition was a blank containing no accelerator. Separate portions of the four compositions were heated at 280° F. for 30, 60, and 90 minutes, and the vulcanized compositions so produced were found to possess the following properties:

TABLE 1

| Accelerator | Modulus at 300% elongation in lbs./in.² (p. s. i.) | | | Tensile Strength at break in lbs./in.² (p. s. i.) | | |
|---|---|---|---|---|---|---|
| (Cure in Minutes) | 30 | 60 | 90 | 30 | 60 | 90 |
| Blank | no cure | 400 | 650 | no cure | 1,350 | 1,725 |
| 2-Mercaptothiazoline | 1,850 | 2,175 | 2,275 | 3,850 | 4,000 | 4,050 |
| Example 1 | 1,700 | 1,950 | 2,125 | 3,900 | 3,925 | 3,875 |
| Example 2 | 1,625 | 1,975 | 2,100 | 3,700 | 3,975 | 3,875 |

The above test demonstrates that the accelerators of the invention are very effective in speeding up the rubber vulcanization process.

Portions of the three unvulcanized compositions containing accelerators were given the Mooney Scorch test at 250° F., in accordance with the article by R. Shearer, A. E. Juve and J. H. Musch, India Rubber World, volume 117, pages 216–219 (1947); the test results are in minutes, and values of 20 minutes and above indicate that the composition is not considered "scorchy." The results are in Table 2.

TABLE 2

| Accelerator | Mooney Scorch at 250° F., minutes |
|---|---|
| 2-Mercaptothiazoline | 13 |
| Example 1 | 20 |
| Example 2 | 24 |

The accelerators of the invention were also tested against 2-mercaptothiazoline and a blank in a synthetic rubber tire tread formula. The rubber in this case was the standard low temperature butadiene-styrene U. S. Government rubber Z-369, containing 1.25% of antioxidant. The formula was as follows:

*Formula II*

| | |
|---|---|
| Synthetic rubber | 100 |
| HAF carbon black | 48 |
| Processing oil | 8 |
| Zinc oxide | 3 |
| Sulfur | 2 |
| Stearic acid | 2 |
| Antioxidant | 0.6 |
| Accelerator | 1.2 |

The compositions were mixed as before and vulcanized by heating at 280° F. for 30, 60, and 90 minutes. Physical properties of the vulcanizates are in Table 3.

TABLE 3

| Accelerator | Modulus at 300% elongation in p. s. i. | | | Tensile Strength at break in p. s. i. | | |
|---|---|---|---|---|---|---|
| (Cure in minutes) | 30 | 60 | 90 | 30 | 60 | 90 |
| None | 150 | 200 | 275 | 150 | 200 | 550 |
| 2-Mercaptothiazoline | 875 | 1,975 | 2,300 | 2,800 | 3,600 | 3,425 |
| Example 1 | 1,200 | 2,075 | 2,350 | 3,400 | 3,700 | 3,500 |
| Example 2 | 675 | 1,700 | 2,050 | 2,425 | 3,625 | 3,650 |

The above tests show that the accelerators of the invention are excellent vulcanization accelerators in synthetic rubber. Vulcanizates of the three compositions produced in the presence of accelerators were aged for 2 days in an oven at 212° F. Physical properties of the aged compositions are shown in Table 4.

TABLE 4

| Accelerator | Modulus at 300% elongation in p. s. i. | | | Tensile Strength at break in p. s. i. | | | Average Percent retained tensile strength |
|---|---|---|---|---|---|---|---|
| (Cure in minutes) | 30 | 60 | 90 | 30 | 60 | 90 | |
| 2-Mercaptothiazoline | | | | 2,575 | 2,150 | 2,450 | 73 |
| Example 1 | | | | 3,125 | 2,700 | 2,700 | 80 |
| Example 2 | | | | 3,000 | 3,125 | 2,825 | 92 |

Thus the new accelerators provide synthetic rubber vulcanizates displaying excellent aging properties.

The invention comprehends the acceleration of sulfur vulcanization whether the sulfur is present in the rubber composition as free sulfur or chemically bound sulfur available for vulcanization as may be provided by the so-called "sulfur donors." Examples of a few known sulfur donors are the following substances:

Tetramethylthiuram disulfide
Polysulfides of phenols and cresols
Diethyl xanthogen disulfide
Polyethylene polysulfides The accelerators of the invention are usually employed in the range of 0.5 to 2.0% by weight of the rubber in the vulcanizable composition, but they are useful in the broader range of 0.1 to 10%. Since the new accelerators are very efficient at the ordinary vulcanizing temperatures of 250–400° F., they do not require further activation for most purposes. However, they may be used in combination with one or more additional conventional accelerators and/or activators to provide special vulcanizable compositions displaying unusually rapid or critical vulcanizing properties and to produce vulcanizates exhibiting superior physical and chemical properties desired for special applications.

What is claimed is:

1. A vulcanizable composition including rubber, sulfur and a small amount of N-tert-butyl-thiazoline-2-sulfenamide.

2. A process of vulcanizing rubber including heating a mixture of rubber, sulfur and a small amount of N-tert-butyl-thiazoline-2-sulfenamide.

3. A vulcanizable composition including rubber, sulfur and a small amount of N-tt-octyl-thiazoline-2-sulfenamide.

4. A process of vulcanizing rubber including heating a mixture of rubber, sulfur and a small amount of N-tt-octyl-thiazoline-2-sulfenamide.

5. A vulcanizable composition including rubber, sulfur and a small amount of a substance having the formula

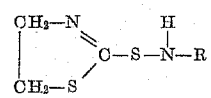

wherein R is a tertiary alkyl radical containing 4 to 12 carbon atoms, inclusive.

6. Process of vulcanizing rubber including heating a mixture of rubber, sulfur and a small amount of a substance of the formula

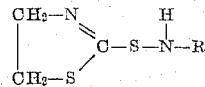

wherein R is a tertiary alkyl radical containing 4 to 12 carbon atoms, inclusive.

References Cited in the file of this patent

UNITED STATES PATENTS

| | | |
|---|---|---|
| Re. 19,286 | Zaucker | Aug. 21, 1934 |
| 2,321,305 | Messer | June 8, 1943 |
| 2,339,002 | Cooper | Jan. 11, 1944 |
| 2,419,283 | Paul | Apr. 22, 1947 |
| 2,445,722 | Carr et al. | July 20, 1948 |
| 2,700,659 | Carr | Jan. 25, 1955 |